Aug. 9, 1966  E. E. SHELDON  3,265,892
SCANNOGRAPH USING FLEXIBLE FIBER LIGHT CONDUCTORS
Filed Dec. 4, 1961  2 Sheets-Sheet 1

INVENTOR.
EDWARD EMANUEL SHELDON
BY L. S. Saulsbury
ATTORNEY

Aug. 9, 1966 E. E. SHELDON 3,265,892
SCANNOGRAPH USING FLEXIBLE FIBER LIGHT CONDUCTORS
Filed Dec. 4, 1961 2 Sheets-Sheet 2

INVENTOR.
EDWARD EMANUEL SHELDON
BY
*L. S. Saulsbury*
ATTORNEY 3,265,892
SCANNOGRAPH USING FLEXIBLE FIBER LIGHT
CONDUCTORS
Edward Emanuel Sheldon, 30 E. 40th St., New York, N.Y.
Filed Dec. 4, 1961, Ser. No. 156,901
14 Claims. (Cl. 250—71.5)

This invention relates to a device for making two or three dimensional images of the internal organs of the body by means of radioactive isotopes and it may be called a scannograph.

This application is a continuation in part of my application Serial No. 624,829 filed on November 28, 1956 and issued as U.S. Patent No. 3,021,834 on February 20, 1962, and it also has a common subject matter with my U.S. Patent No. 2,877,368, filed on March 11, 1954, and issued on March 10, 1959. In the prior art pictures known as scannograms were obtained by using a collimated scintillation counter scanning the examined organ. This method however proved to be very unsatisfactory because the dose of radioisotopes for safety reasons had to be extremely small. The amount of isotopes such as radio-iodine for thyroid visualization or of radio-arsenic or radio-potassium for brain studies are of the order of microcuries only. This small dose produces such a weak radiation that the time of exposure necessary to form a picture is at least thirty to sixty minutes. It is obvious that the patient cannot maintain a fixed position for such a long time. The image is blurred and offers very little diagnostic information. I discovered that the blurring effects due to the motion of patients can be eliminated by using my novel device. This device comprises in combination a luminescent screen secured firmly to the outer surface of the patient's body, a flexible light conductor consisting of a plurality of light conducting fibers forming together a bundle in which the end-faces of said fibers are firmly fixed together and a photosensitive receiver which receives the image conducted by said bundle. The luminescent screen receives gamma or neutron image produced by the radioactive isotope in the examined organ and converts said image into a luminescent image. The luminescent image is conducted by the light conductor to the photosensitive receiver in which it is converted into a visible fluorescent or photographic image corresponding to the original radioisotope image.

I found that by using this novel device the patient may move during examination and in spite of it the image will not be blurred at all, which was not possible until now.

In addition my device allows to store weak radioisotope images and reproduce them in an intensified form which was not possible with devices of the prior art.

Besides the blurring effect of the motion of the patient the radioisotope images suffer from a very poor signal to noise ratio. It means that the background radiation is almost equal to the diagnostic i.e. image forming radiation and therefore the definition and contrast of reproduced images is very low. In my device the image producing radiation i.e. diagnostic radiation is accumulated and stored to produce a satisfactory signal to noise ratio, whereas background radiation is markedly attenuated.

In another embodiment of my invention the background radiation is subtracted from the stored image of both diagnostic and background radiations, resulting in production of the image of diagnostic radiation only.

The invention will appear more clearly from the following description when taken in connection with the accompanying drawings by way of example only, preferred embodiments of the inventive idea.

Figure 1A:
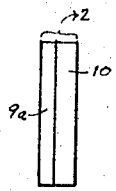
FIGURES 1a, 1b, 1c, 1d, 1e and 1A represent various modifications of the luminescent screen used in this invention.
Figure 1B:
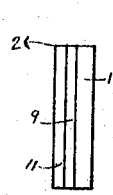
Figure 1A:
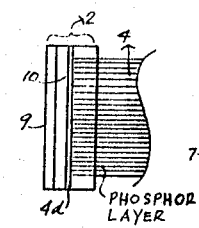
Figure 1:
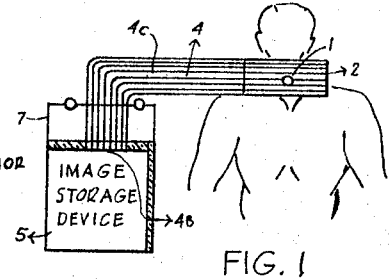
FIGURE 1 represents the novel scannograph.
Figures 2, 3, 3A, 3B:
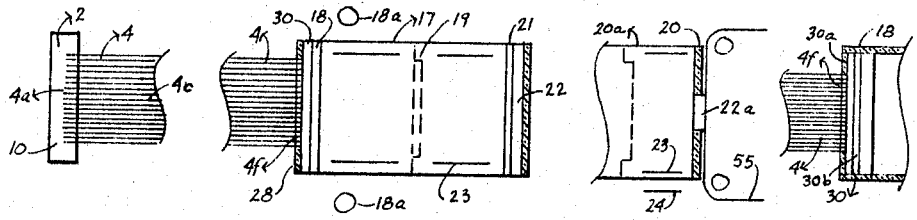
FIGURE 2 shows union of the luminescent screen and of the bundle of fibers.
FIGURE 3 shows the combination of the bundle of fibers with an image storage tube.
FIGURE 3a shows a modification of the image tube for recording the final image.
FIGURE 3b shows the union of the endface of the fibers with the photocathode of the tube.

FIGURE 1 shows one embodiment of my invention. The patient receives a radioactive isotope such as RaI. The radio-iodine accumulates selectively in the thyroid and emits gamma rays. The pattern of emitted gamma rays depicts the internal structure of the thyroid 1. A luminescent screen 2 is placed over the patient's neck. Gamma rays emitted from thyroid are absorbed by the luminescent material 10 in screen 2 such as ZnSCdS, CsI, NaITl or $CaWO_4$ and are converted into a luminescent light image. This image is too faint to be reproduced by conventional means. In addition the motion of the patient makes it impossible to store this image without destroying its definition. I discovered that this motion problem can be solved as follows. A bundle 4 of light conducting fibers 4c is fused to one endface of the screen 2 as shown in FIGURE 2. The phosphor 10 may be fused with the endface 4a of the bundle 4 by means of binders such as potassium silicate. The endface 4a is made smooth and even before deposition of the phosphor thereon. The preferred technique of deposition of the phosphor comprises formation of an organic layer such as of nitrocellulose on the endface 4a, first, and then settling the particles of phosphor on said organic layer. In some cases we may preferably use an evaporated layer of a phosphor which gives better definition of the image. In some cases it is preferable to form the luminescent layer in a honeycomb structure such as a honeycombed mesh screen. This construction will prevent lateral diffusion of the luminescent light and will improve thereby the definition of the image, at the expense however of sensitivity. In another embodiment of my invention the endface 4a of the fibers bundle 4 is releasably attached to the surface of the screen 2 by means of clamps or other mechanical means, instead of being fused with it. The free endface of the screen 2 is glued to the patient's skin over the thyroid or other examined organ such as brain, liver or spleen by means of any light opaque cement or glue.

The luminescent image produced by gamma rays emitted from the examined organ is conducted by the fibers bundle 4 to the image storage device 5. I found that the image storage device 5 should be disposed a distance from the patient at least 30 cm., because this separation markedly improves definition and contrast of reproduced image. The explanation for this phenomenon, I found, resides in the presence of a large background radiation from the organs adjacent to the examined part. The intensity of this background radiation decreases proportionately to the square of the distance, e.g. at a distance of 30 cm. from the patient's outer surface it falls down to 1/900 of original intensity. On the other hand losses of luminescent light conducted by the bundle of fibers for a distance of 30 cm. are negligible. It follows therefore that the diagnostic radiation in my device will be at a distance of 30 cm. from the examined organ only slightly attenuated, but the background radiation will be reduced by a factor of 900. In the end result the final reproduced image will be of much better contrast and definition than in devices of the prior art.

The luminescent screen should be preferably flexible to conform to the contour of the patient's surface. Flexible luminescent screens may be produced by using powdered phosphors in a plastic base such as vinyl. The luminescent screen of alkali halides is advantageous because it may be made thick enough to intercept a large percentage of gamma rays emitted from the patient without too much loss of definition. The phosphor should be backed by a light reflecting layer 9, such as of aluminum or a light diffusing layer such as titanium oxide, as shown in FIGURE 1a.

In some cases it is preferable to add to the screen 2 a heavy metal layer 11 such as of gold, platinum or uranium which intercepts gamma rays and emits electrons, as shown in FIGURE 1b.

I discovered that the contact of the endface 4a of the bundle 4 with the luminescent layer 10 caused an unexpected deterioration of said luminescent layer. It was found that the best way to prevent this impairment of the luminescent layer 10 was to provide a thin separating light transparent layer 4d between the endface 4b of the bundle and the luminescent layer. The light transparent layer 4d may be of $Al_2O_3$ or silicon oxide and it may be of the thickness of a few millimicrons. It is important that $Al_2O_3$ or other separating layer used should be of continuous, non-porous type to prevent exchange of ions through said layer. Also good results may be obtained by using a conducting light transparent layer such as of iridium, palladium or tungsten. In some cases for the best results we may use a combination of $Al_2O_3$ layer with a light transparent conducting layer. The light transparent separating layer may be deposited on the end face 4a by evaporation or by electrophoresis or by electroplating technique.

Figure 9:
FIGURE 9 shows grid-screen combination.

An additional improvement for the reducing effects of background radiation, is obtained by making the layer 9 of aluminum or lead 9a of a thickness which will absorb a predetermined amount of gamma radiation emitted by the radio-isotope used for the particular examination. The amount of radiation to be absorbed by the filter layer 9a will depend on the ratio between the background radiation and diagnostic radiation produced by the radio-isotope. This construction of screen 2 is shown in FIGURE 1A. There is another way to improve the definition of the final image, at the expense however of sensitivity. This is accomplished by using a Lysholm grid 2B between the patient's body and the luminescent screen 2 as shown in FIGURE 9. The grid 2B and the screen 2 are fixedly attached to each other by means of clamps, hooks or other mechanical means, or are fused together in order to form one unit which is fixed to the patient's body over the examined organ. The grid serves to eliminate a large part of scattered gamma radiation and to transmit the diagnostic radiation. The Lysholm grid known in the art of radiology is a rigid structure. For the purposes of my invention it is necessary however to use a grid which has flexibility to conform to the patient's body. In some examinations therefore the conventional grids should not be used for this device. This problem was solved by making the frame 2C of Lysholm grid of a flexible material such as plastic e.g. of vinyl, polyester, or Lucite to which the metallic strips are attached.

In some examinations the luminescent screen 2 does not have to conform to the surface of the patient's body. In such cases Lysholm grid may be rigid.

Figures 1C, 1D:
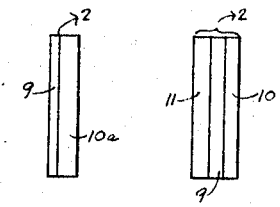

In some cases instead of a gamma emitting isotope we may use a neutron emitting substance. In such cases the screen 2 should have a layer 11 reactive to neutrons such as of boron, paraffine or gadolinium, as shown in FIGURE 1c. In other cases it is preferable to embed the neutron sensitive material in the phosphor layer 9, as shown in FIGURE 1d.

Figure 1E:
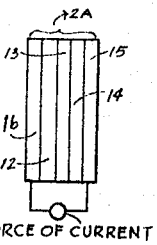

Also the use of electro-luminescent phosphor is within the scope of my invention, as shown in FIGURE 1e. The luminescent screen 2A comprises a conducting layer 16 transparent to gamma rays or to neutrons, a layer 12 reactive to gamma rays or to neutrons which changes its conductivity when irradiated by gamma or neutrons, a light opaque layer 13, an electro-luminescent phosphor 14 such as ZnSCu or ZnSMn and a light transparent conducting layer 15. This composite screen is connected to the source of A.-C. or D.-C. current and it amplifies the intensity of the luminescent image by a factor of 10 to 100.

The image conductor 4 consists of multiple fibers of material having a high refractive index such as quartz, rutile or special plastics. In many applications the image conductor must be flexible and easily malleable. In such cases, acrylic plastics, such as Lucite or polystyrenes may be used. Flint glass and other above-mentioned materials characterized by a high refractive index have the property of internal reflection of the light conducted by them. Such materials cannot conduct a whole image as such but they can conduct well a light signal, which means an image point. The size of the image point I found is determined by the diameter of a single conducting fiber 4c. In my image conductor I assembled a bundle of such fibers which form a mozaic-like end-face and which, therefore, can conduct plurality of image points. All these image points will reproduce at the other end-face of the image conductor the original image, provided that the ends of image conducting fibers remain in their original spatial relationship. Each fiber 4c should have, as was explained above, a diameter corresponding to the size of one image point. The diameter of 0.1 millimeter is well suitable for the purposes of my invention. In order to conduct an image of an area, e.g., of one square centimeter, in size, we will need 40 fibers of 0.25 millimeter in diameter. The light conducting fibers should be polished on their external surface very exactly. Each of said fibers should be preferably coated with a light transparent layer of material having a lower index of refraction than the core itself. Low index glasses such as borosilicates are suitable for this purpose. The thickness of said coating may be only a few microns or even less. Each of said fibers may also be coated with a very thin light opaque layer 4b to prevent spreading of light from one fiber to another. I found that without said light-impervious coating, the image will be impaired by leakage of light from one fiber to another. The light opaque layer should have a lower index of refraction than the light conducting fiber itself. Such a coating may have a thickness of only a few microns. I found a great improvement of flexibility of the light conductor 4 can be obtained by having the light conducting fibers 4c glued or fused together only at their end-faces 4a and 4b. I found unexpectedly that having the conducting fibers 4c free along their path between the end-faces will not cause any deterioration of the conducted image. I found that in spite of the fact that fibers between their end-surfaces were freely movable, there was no blurring of the conducted image. It must be understood, however, that the fibers 4c at both end-faces of the conductor 4 must rigidly maintain their spatial relationship. Another important feature of this construction is that the diameter of the light conductor 4 can now be increased because no space consuming binder or glue is present between the fibers 4c except at their end-faces. Instead of using the binder at the end-faces of fibers 4c, they may also be held together at their end-faces by a fine mesh screen. Each fiber is threaded through one opening of said mesh screen and is being held by said screen in constant position. It may be added that smaller loss of light may be obtained if the fibers 4c are hollow inside instead of being solid.

Figure 1F:
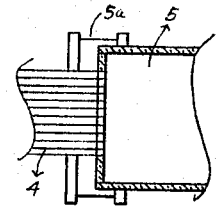
FIGURE 1f shows the attachment of the bundle of light conducting fibers to the vacuum tube.

The receiver for the luminescent image conducted by the bundle 4 from the screen 2 should be preferably an image storage device of vacuum type 5. I have found that for the best results it is important that the end-face 4b of the fibers bundle 4 should be inside of the vacuum tube 5 and in close contact with the photo-cathode 18. In order to reduce the pull of the bundle 4 on the vacuum tube 5 which may cause leaks and impair the vacuum tightness, it is advisable to provide extensions 7 which support the bundle 4 and take up the weight of the bundle from the endwall of the tube. In cases in which the definition can be sacrificed, the end-face 4b may be releasably attached to the end-wall of the vacuum tube which carries the photo-cathode by means of clamps 5a or other mechanical means such as rods or hooks, as shown in FIGURE 1f.

Figure 8:
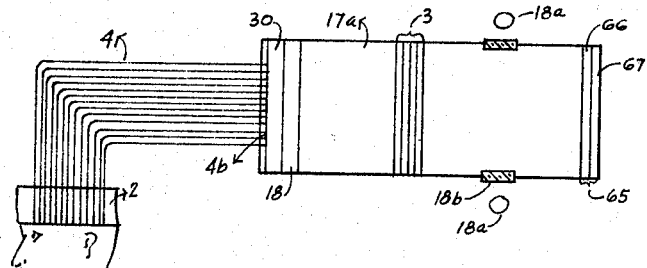
FIGURE 8 shows a system using a novel modification of the image storage tube.

In the embodiment of the invention shown in FIGURE 3 the conducted image is accumulated and stored in the image storage tube 17 a long period of time such as 30 to 60 minutes. The time depends on the amount of the radio-isotope which may be used safely for the patient. The luminescent image conducted by the bundle 4 is converted into photoelectron image in the photo-cathode 18 which may be of Cs-Sb or of multi alkali-antimony type or of any photoemissive material and this emitted photoelectron beam is accumulated in the dielectric storage target 19 as a charge image. When the accumulation process is completed, the photocathode 18 is irradiated with an extraneous source of light 18a which produces a broad reading electron beam. The reading beam reproduces the stored image in the fluorescent screen 22 provided with Al backing 21 as a visible image. Instead of fluorescent screen 22 other recording surfaces may be used as well, such as alkali halides screen in which a semi-permanent image may be produced. This modification of my invention is illustrated in FIG. 8 which shows a novel vacuum tube for receiving and storing the image conducted by the bundle 4. The bundle 4 may be mechanically connected to the endwall of the novel vacuum tube 17a or may be mounted in a fixed optical relationship with the photo-cathode of said tube using an optical member or may be united with the photocathode 18, as was described above. Luminescent image conducted by the bundle 4 is converted by the photo-cathode 18 into a photoelectron image. The photoelectron image is intensified by a composite screen 3 comprising a fluorescent layer and a photoemissive layer. Such screens are described in my U.S. Patent 2,555,424 and are not the subject matter of the present invention. The intensified photoelectron image is focused on the image reproducing screen 65 by electrostatic or electromagnetic focusing fields. The image reproducing screen 65 comprises a light transparent conducting layer 66 and a layer 67 which produces color centers when bombarded by electrons. Such materials are alkali halides. KCl is especially suitable for this purpose. The image formed in the screen 65 is made visible for examination by irradiating said screen with the light from the source 18a through windows 18b in the envelope of the tube. The image on the screen 65 remains stored for a long time. The longer is the exposure time, the greater will be the build-up of the image in the screen 65 which will permit visualization of very weak images. The stored image may be erased by heating the screen 65 by means of an electrical current or by infra-red radiation. After the erasing of the image the tube 17a may be used for another examination.

In some cases the endwall of the vacuum tube receiver may be very thin by using in the endwall 20 a mica insert 22a of a thickness of a fraction of one mil to a few mils. This mica insert will transmit electrons of the reading beam after they have been accelerated by electrostatic fields 23. In this construction the image tube 20a, as shown in FIG. 3a, must have deflection means such as electrostatic plates or electromagnetic coils 24 which will move the electron image across the mica insert 22a to reach the moving recording surface 55 such as Electrofax paper or Xerographic plate.

The bundle 4 for the best results has its end-face 4b within the vacuum tube in close contact with the photocathode 36a. In cases in which the definition is not critical the end-face 4b may be releasibly attached to the outer surface of the end-wall 28 of the vacuum tube 17 or 36, as was explained above.

Figure 3C:
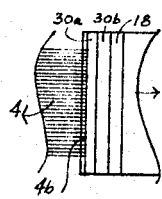
FIGURE 3c shows a modification of the device illustrated in FIGURE 3b.

I discovered that the contact of the end-face 4b of the bundle 4 with the photocathode 18 of alkali-antimony type caused an unexpected deterioration of said photocathode. I believe that this effect is due to the presence of boric oxide or lead oxide which are common ingredients in glasses which have a high refraction index. It was found that the best way to prevent this poisoning of the photoemissive photocathode was to provide a thin light transparent member 30 between the end-face 4b of the bundle and the photoemissive layer 18 as shown in FIG. 3b. The light transparent separating layer 30 may be of $Al_2O_3$ or silicon oxide and it may be of the thickness of a few millimicrons. It is important that layer 30a of $Al_2O_3$ or other layer used should be of continuous, non-porous type to prevent exchange of ions through said layer. Also good results may be obtained by using a conducting light transparent layer such as of iridium, palladium, or tungsten of similar thickness. In some cases for the best results we may use a combination of $Al_2O_3$ layer with a light transparent conducting layer 30b, as shown in FIGURE 3c.

I also found that the end-face 4b must be very smooth to prevent non-uniformity of the photoemissive layer or of photoconductive layer which are deposited thereon. Otherwise false potential gradients will be produced which will effect the definition of the image.

Another important feature of the construction of my device is the provision for protecting the vacuum of the receiver.

The fibers of the bundle 4 when subject to the ionizing radiations, were found to discolor which caused losses of transmitted light. The addition of cerium to the glass used for making fibers prevented this complication.

The bundle of fibers 4 in some cases has to have a large end-face 4a to correspond to the size of the examined organ. If the receiver 5 is a vacuum tube, the photocathode 18 usually is smaller than the end-face 4a. It follows therefore that the light conducting fibers must be tapered in the direction of the receiver 5, so that their end-face 4b will correspond to the size of the photocathode of the receiver.

As the fibers have a high index of refraction and alkali-antimony photocathode has a lower index of refraction it is advisable to interpose between the end-face 4b and the photocathode 18 a light transparent layer of the thickness of the order of odd number of quarters of wave-length of the light conducted by such fibers and having an index of refraction $n=\sqrt{n_1 n_2}$. In this equation $n_1$ is the index of refraction of fibers and $n_2$ is the index of refraction of alkali-antimony photocathode.

The fibers 4c of the bundle 4 should preferably have in addition a light opaque coating. In case the individual fibers do not have the light opaque coating, the whole bundle 4 should have a light opaque sheath to prevent penetration of the light into the bundle.

Figures 4, 6, 7:
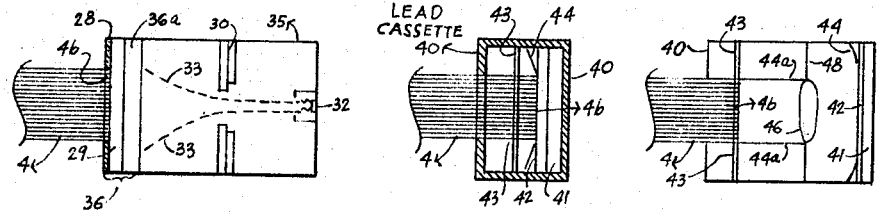
FIGURE 4 shows the bundle of fibers in combination with an image tube of electron mirror type.
FIGURE 6 shows the novel cassette comprising in combination bundle of fibers and a recording surface.
FIGURE 7 shows a modification of the cassette in which optical system is used between the bundle of fibers and the recording surface.

Another type of image storage tube suitable for the purpose of this invention is the tube of electron mirror tube type which is shown in FIG. 4. This tube is well known in the art, it is believed therefore that its detailed description is not necessary. The tube 35 has a photocathode 36 which comprises a photoconductive layer 36a such as CdS, $Sb_2S_3$ or CdSe and comprises in addition a light transparent conducting layer 29 which may be of a metal such as an iridium or gold or of Nesa made by Pittsburgh Glass Co. The electron gun 32 produces a reading beam 33, the reflected electron beam strikes the image reproducing screen 30. The image reproducing screen 30 may be of a fluorescent material or may be of alkali-halides such as KCl which produces a semi-permanent so called "black trace" image. It should be understood that this type of tube may be also provided with a mica insert 22a, as was explained above.

Figure 5:
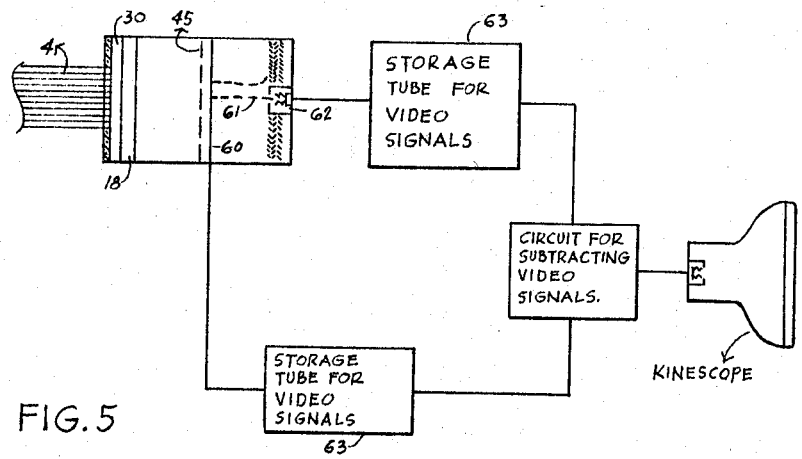
FIGURE 5 shows the combination of the bundle of fibers with a television pickup tube and with storage tube for video signals.

I found that better results can be obtained by using as a receiver 5 for the conducted image a pick-up tube of television type. It was found that a television system will permit a better contrast and detail of reproduced images. For the purposes of this invention we may use any type of television tube such as of photoemissive type or of a photoconductive type. We may use an Image Orthicon, Vidicon, Permachon or Image Vidicon. The conducted image is brought by the bundle 4 to the pick-up tube 45 of Image Orthicon type, as shown in FIGURE 5. The construction of Image Orthicon is well known in the art and does not have to be described in detail. In order to achieve the best storage the semi-conducting glass target 60 of Image Orthicon may be replaced by a target of a high resistance such as extremely thin target of glass or a target used in the tubes known as Metrechon or Radechon made by Radio Corporation of America. This type of target allows a long accumulation and storage of the electron image. When the accumulation process is finished, the storage image may be read out by a scanning electron beam 61 from electron gun 62. Video signals produced by the receiver may be fed into a special storage tube 63 for video signals such as "Kiloton" tube manufactured by Raytheon Company where they may be further stored and accumulated, if necessary, before feeding them into a final image reproducing device such as kinescope. Instead of "Kiloton" tube we may also use the storage tubes for video signals which have a target operating by electron bombardment induced conductivity such as known in the art for scan conversion. Instead of using storage tubes for the video signals we may also feed video signals directly into kinescopes of storage type which are known in the industry and are produced by Radio Corporation of America No. C73959 or No. C73922 or by Hughes Electronics Company and called Tonotron. Such video signals storage tubes are well known in the art and do not have to be described in detail.

I found that as long as the end-face 4a remains fixed to the patient's body and the end-face 4b is in a fixed relationship to the vacuum tube 5, the image will be faithfully reproduced regardless of the duration of exposure and motion of the patient during said exposure.

In cases in which the light conservation and therefore sensitivity of this device is not a paramount problem, the construction may be simplified by mounting the endface 4b of the bundle 4 outside of the vacuum tube 5 and by projecting the conducted image onto the photocathode 18 of said tube by means of a lens 46 or other optical members such as light reflecting Schmidt system. It was found that if this arrangement be operative, the lens or other optical member must be firmly attached or connected with the endface 4b to move together with it as one unit. In addition the lens 46 must be fixed in its position by mechanical supports to provide a fixed optical relationship with the photocathode 18 of the receiver tube.

In cases in which we can use a large amount of radio-isotope, a photographic film 42 or other recording surface can be applied instead of a vacuum tube 5. The use of a photosensitive recording material is shown in FIGURE 6 which represents the novel type of lead-lined cassette 40 having a window for admitting the endface 4b of the bundle of fibers 4 and the hooks or clamps 43 for immobilizing the endface 4b of the bundle in a fixed contact with the photosensitive plate 42. It should be understood that any mechanical device for maintaining the endface 4b in a fixed position can be used as well. The recording surface 42 has a base 41 of a light reflecting or light diffusing material. We may use a photographic film or electrographic plate or xerographic plate for the purposes of reproducing the final image. The recording surface 42 is maintained in a fixed position by clamps, springs or other mechanical devices 44 and rests against the endwall of the cassette 40.

In some cases when the light conservation is not essential, the conducted image from the endface 4b may be projected onto recording medium 42 by means of a lens 46 or other suitable optical element such as reflecting optical system, as shown in FIGURE 7. It was found that the lens 46 must be in a fixed relationship with the endface 4b of the bundle to prevent blurring effects of the motion of the patient during the exposure. This may be accomplished by attaching the lens to the endface 4b or by providing extensions 44a or any other mechanical means to hold the endface 4b and the optical element 46 in a fixed mutually cooperative relationship. In addition the lens 46 must be held in a fixed position by clamps 48 to provide a fixed optical relationship to the film or other recording surface 42.

I found that as long as the endface 4a remains fixed to the patient's body and the endface 4b is in a fixed relationship to the lens 46, and the lens 46 is in a fixed optical relationship to receiver 5, the image will be faithfully reproduced regardless of the duration of exposure and motion of the patient during said exposure.

In spite of my novel device, the background radiation cannot be completely removed and it will affect the receiver 5. Although it is markedly attenuated by the novel combination of the luminescent screen 2 of light conductor 4 and of receiver 5, it is still present. In cases in which the best detail and contrast of the image are necessary, this residual background could be eliminated by subtraction of the stored images in the storage tube.

The application of this method is possible by the knowledge of the time necessary for the radio-isotope to reach the examined organ and the time necessary for the selective accumulation of the radio-isotope in the examined organ. For example the time necessary for radio-iodine to reach the thyroid is only a fraction of one minute. On the other hand selective accumulation of radio-iodine in the thyroid takes many hours. It follows that gamma radiation emitted from the patient's thyroid during the first hour after administration of radio-iodine represents essentially the background radiation. We can store said background radiation image in the same manner as was described for the storage of the diagnostic radiation image. It will be necessary to store the background radiation image in the "Kiloton" storage tube as a negative charge image. Subsequently when the radio-iodine is accumulated in the thyroid we will store the mixture of the background and diagnostic radiations in the same storage tube as a positive charge image in the storage target, in the manner which was described above. As a result the background radiation image A will be subtracted from the image B which is a mixture of the diagnostic image C and of the background radiation image A. In this way there will be left in the storage target only the diagnostic image C for further reproduction.

The subtractive process for eliminating the background radiation may be also accomplished by using two storage tubes for video signals synchronized together. One storage tube will serve to store the background image A. The second storage tube will serve to store the image B which is a mixture of diagnostic image C and background image A. The subtraction of synchronized video signals from both storage tubes occurs in a mixer. The final video signals coming out of the mixer represent only the diagnostic image C.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

What I claim is:

1. A device for inspection comprising in combination luminescent means producing luminescent radiation, an image conductor comprising a plurality of fibers, said fibers having the property of conducting said radiation by internal reflection, said fibers having a core of material transparent for said radiation and having a high index of refraction, said fibers being provided with a coating of a lower index of refraction than said transparent core and of the thickness not exceeding a few microns for preventing the escape of said radiation from said fibers, said device further comprising photoelectric means mounted on the endfaces of all said fibers at one end of said fibers, and said luminescent means being mounted adjacent the opposite end of said fibers.

2. A device for inspection comprising in combination luminescent means producing luminescent radiation, an image conductor comprising a plurality of fibers, said fibers having the property of conducting said radiation by internal reflection, said fibers having a core of material transparent for said radiation and having a high index of refraction, said fibers being provided with a light opaque coating of a lower index of refraction than said transparent core and of the thickness not exceeding a few microns for preventing the escape of said radiation from said fibers, said device further comprising photoelectric means mounted on the endfaces of all said fibers at one end of said fibers, and said luminescent means being mounted adjacent the opposite end of said fibers.

3. A device as defined in claim 1, in which said photoelectric means are mounted in a vacuum tube.

4. A device as defined in claim 1, in which said photoelectric means are mounted in a vacuum tube and said photoelectric means are adapted and arranged to produce a beam of free electrons, said tube further comprising electrostatic means for focusing said electrons and means for utilizing said electrons.

5. A device as defined in claim 1, in which said photoelectric means are mounted in a vacuum tube and comprise a photoconductive material, and said vacuum tube has means for converting said luminescent light into electrical signals.

6. A device as defined in claim 2, in which said plurality of fibers forms a flexible bundle.

7. A device as defined in claim 2, in which said photoelectric means are mounted in a vacuum tube and are adapted and arranged to produce a beam of free electrons, said tube further comprising means for utilizing said electrons.

8. A device as defined in claim 2, in which said photoelectric means are mounted in a vacuum tube and said vacuum tube comprises means for converting said luminescent light into electrical signals.

9. A device as defined in claim 4, in which said vacuum tube has means for converting said luminescent light into electrical signals.

10. A device as defined in claim 5, which comprises in addition means for the storage of said electrical signals.

11. A device as defined in claim 8, which comprises in addition means for the storage of said electrical signals.

12. A device for inspection comprising in combination luminescent means producing luminescent radiation, an image conductor comprising a plurality of fibers, said fibers having the property of conducting said radiation by internal reflection, said fibers having a core of material transparent for said radiation and having a high index of refraction, said fibers being provided with a light opaque coating of a lower index of refraction than said transparent core and of the thickness not exceeding a few microns for preventing the escape of said radiation from said fibers, said device further comprising photoelectric means mounted in a vacuum tube on one endface of all said fibers, and at one end of said fibers, said luminescent means being mounted adjacent the opposite end of said fibers, and said fibers traversing the endwall of said tube.

13. A device as defined in claim 12, in which said photoelectric means comprise photoconductive material.

14. A device as defined in claim 12, in which said photoelectric means are adapted and arranged to produce a beam of free electrons, said tube further comprising electrostatic means for focusing said electrons and means for receiving and utilizing said electrons.

References Cited by the Examiner

UNITED STATES PATENTS

| | | | |
|---|---|---|---|
| 2,764,693 | 9/1956 | Jacobs | 88—1 |
| 2,776,377 | 1/1957 | Anger | 250—71.5 |
| 2,877,368 | 3/1959 | Sheldon | 88—1 |
| 3,048,698 | 8/1962 | Carlson | 250—71.5 |
| 3,051,166 | 8/1962 | Hovnanian | 128—4 |
| 3,058,021 | 10/1962 | Dunn | 313—65 |
| 3,123,712 | 3/1964 | Spooner | 250—71.5 |

RALPH G. NILSON, *Primary Examiner.*

J. W. LAWRENCE, *Assistant Examiner.*

Disclaimer and Dedication 3,265,892.—*Edward Emanuel Sheldon*, New York, N.Y. SCANNOGRAPH USING FLEXIBLE FIBER LIGHT CONDUCTORS. Patent dated Aug. 9, 1966. Disclaimer and dedication filed Nov. 11, 1976, by the assignee, *American Optical Corporation*.

Hereby disclaims and dedicates to the Public the remaining term of said patent.

[*Official Gazette February 1, 1977.*]